April 9, 1957   E. W. ADOLPHSON   2,787,877
DRAFT ARRANGEMENT FOR CORN PICKERS
Filed May 4, 1954   2 Sheets-Sheet 2

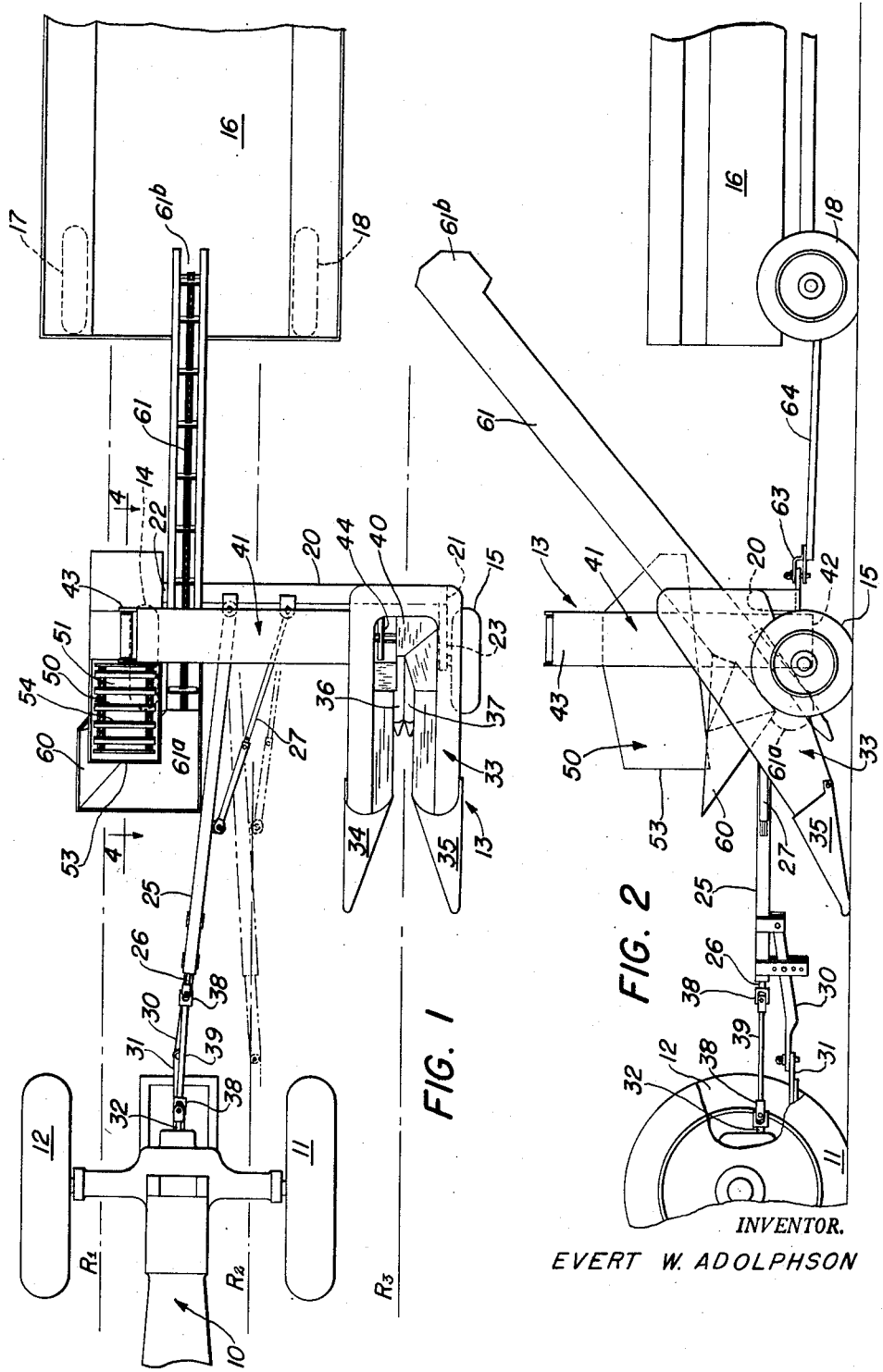

INVENTOR.
EVERT W. ADOLPHSON

United States Patent Office 2,787,877
Patented Apr. 9, 1957

2,787,877

DRAFT ARRANGEMENT FOR CORN PICKERS

Evert W. Adolphson, Des Moines, Iowa, assignor to Deere Manufacturing Co., Dubuque, Iowa, a corporation of Iowa Application May 4, 1954, Serial No. 427,452

5 Claims. (Cl. 56—18)

The present invention relates generally to crop harvesting implements and more particularly to a corn harvester of the type to be pulled to the rear of a tractor and over a field of row planted corn. Specifically it provides for a novel arrangement of the various parts making up the corn harvester that will give lateral compactness to the unit and better balance, efficiency, and durability.

The prior art concerning trail-behind corn pickers shows in most instances a picking unit positioned outwardly of one of the rear wheels of the tractor and in position to pick the row of corn adjacent to the wheel. The husking unit is mounted to the rear of the picking unit and a crop conveyor is proximate to both the picking and husking units. With this arrangement the weight of the corn harvester is concentrated mostly to the side and usually outwardly of the rear wheel of the tractor with the consequence that considerable side draft is exerted on the tractor. Effort has been made to alleviate this condition by positioning the wagon or crop receptacle on the opposite side of the tractor from the picking unit in order to balance the weight of the harvester and to move the overall center line of draft closer to coinciding with the fore-and-aft center line of the tractor. This condition however creates another problem inasmuch as the wagon straddles additional rows of corn than those already straddled by the tractor and harvester which requires those additional rows to be picked by hand or a different type of machine when opening a new field. Also, the side draft effect of the wagon is proportionate to the degree the wagon is loaded and varies throughout the harvesting operation.

Therefore from an efficiency standpoint, it is desirable to make the harvester as laterally compact as possible and from an operational standpoint to so balance the various parts of the harvester and the tractor-harvester-wagon assembly that the center line of draft will closely approximate the fore-and-aft center line of the tractor.

It is therefore a primary object of this invention to provide a tractor drawn corn picker that has its gathering unit in position to harvest the row of corn adjacent to and outwardly of one of the rear wheels of the tractor and has its husking unit spaced transversely from the picking unit and on the opposite side of the corn picker from the picking unit so that it falls to the opposite side of an extension of the fore-and-aft center line of the tractor resulting in the center line of draft of the harvester falling in close proximity to the aforementioned tractor center line.

With the spaced apart relationship of the husking and picking unit, it becomes practical to position the crop elevator inwardly of the husking unit and it is another object of the invention to provide a fore-and-aft extending crop discharge elevator that receives crops from a position inwardly of the husking unit and is further positioned in its rearward projectory substantially above a rearward extension of the fore-and-aft center line of the tractor.

Still a further object of the invention is the provision of a rear hitch on the main frame of the harvester to which the tongue of the wagon or crop receptacle may be attached. It is desirable that the wagon straddle the same crop rows as the tractor and as such the hitch is located close to the fore-and-aft center line of the tractor.

It will become apparent as the description of the invention unfolds that through the proper placement of the parts that make up the harvester the side draft effect of the harvester on the tractor will be eliminated or at least minimized, and that with the crop discharging elevator and wagon on the fore-and-aft center line of the tractor the varying load in the wagon and elevator will have little side draft effect on the tractor. Maximum efficiency of the tractor will be obtained since the entire load of the harvester and the wagon will be directly to the rear of the tractor. By placing the crop discharging elevator inwardly of the husking unit the harvester maintains a lateral compactness sufficient to permit the assembly of the machines to require only the width of two rows of corn in addition to the row being picked. Thus when opening a field it is necessary to pick only two rows of corn by hand along the fence, or the assembly can be used to follow a two-row tractor-mounted corn picker without hand picking.

It is still a further object of the invention to provide adjusting means for laterally positioning the harvester in relation to the tractor so that the harvester will be readily adaptable to both one- and two-row tractors.

Other objects and advantages of the invention will be apparent to those skilled in the art after a consideration of the following description, in which reference is had to the drawings appended hereto, in which Figure 1 is a plan view of the tractor-corn picker-wagon assembly (the forward portion of the tractor and the rear part of the wagon being omitted to permit a larger scale drawing) embodying the principles of the invention and showing the relation between the three vehicles during operation and their positions relative to the several rows of corn, which are indicated in broken lines in the figure.

Figure 2 is a side elevational view of the assembly or train shown in Figure 1. A portion of the rear wheel on the tractor has been removed to show clearly the connections between the tractor and the corn picker.

Figure 3:
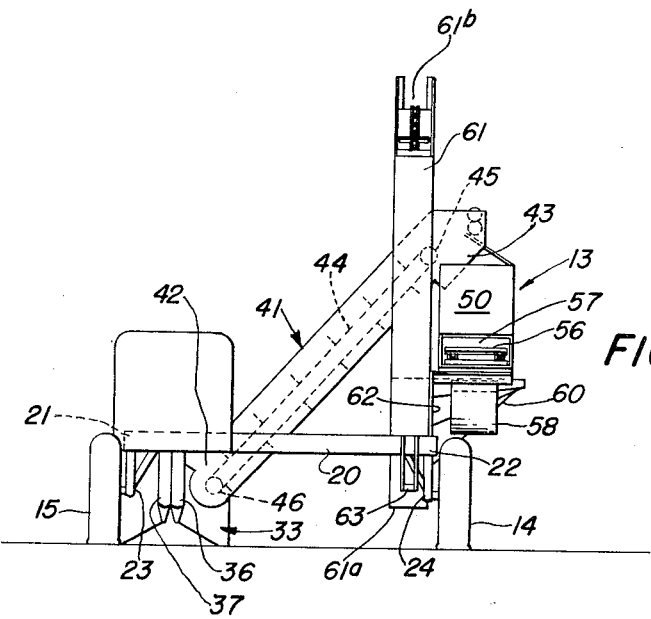
Figure 3 is a rear elevational view of the corn picker.
Figure 4:
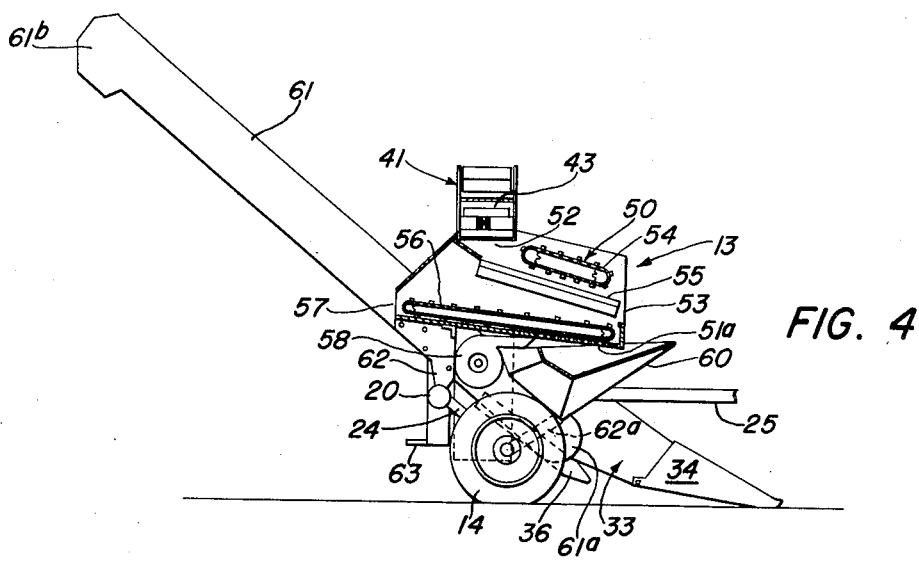
Figure 4 is a side elevational view of the corn picker with the husking unit shown in section as seen along the line 4—4 of Figure 1.

Referring now to Figures 1 and 2, a tractor 10 having two rear wheels 11, 12 straddling two rows of corn $R^1$, and $R^2$ has in drawn relationship to it a corn harvester 13 mounted on two transversely spaced wheels 14, 15 that straddle adjacent rows of crops $R^2$ and $R^3$. A trailing receptacle or wagon 16 is connected to and trails the harvester in fore-and-aft alinement with the tractor, having its wheels, of which only two front ones are visible at 17, 18, straddle the same rows of crops $R^1$, and $R^2$ as the tractor. The tractor and wagon are of a usual commercial design and for purposes of this invention will not be described in detail since it is not important to an understanding of the invention.

The corn harvester 13 has a main tubular supporting frame 20 having first and second sides 21, 22 spaced apart transversely to the line of travel and journaled at the aforementioned transversely spaced apart wheels 14, 15 through axle supporting arms 23, 24.

Extending forwardly from the tubular main frame 20, or in the direction of the tractor, is a second tubular member 25 that serves as a draft tongue and contains within it a power take off drive shaft 26. An adjustable stabilizing member 27 is pivotally connected to a midportion of the tubular member 25 and a portion of the frame 20 laterally spacer apart from the rear end of the draft tongue 25. Hitch means 30 is provided for connecting the draft tongue 25 to a tractor drawbar 31. A power take off shaft 32 of the tractor is conected by universal joints 38 and an intermediate shaft 39 to the power shaft 26.

A gathering unit 33, having gatherers 34 and 35, is carried by the main frame 20 at the first side 21 of the frame 20 just inwardly of the wheel 15. It is not unlike many of the units common to the trade and its construction will not be detailed other than is necessary to an understanding of the invention. The gatherers 34, 35 extend forwardly to gather from a row crop R³ which is adjacent to and outwardly of the tractor wheel 11. A pair of snapping rolls 36, 37 sever the ears from the stalks and drive them rearwardly in the conventional manner to a rear discharge end 40 behind the transverse center line of the wheels whence they gravitate to a receiving end 42 of a transverse crop conveyor 41. The conveyor is carried by the main frame 20 and has its receiving end 42 at a relatively low level and from there inclines upwardly and laterally to a relatively high delivery end 43 which is disposed above the wheel 14 and outwardly of the end 22 of the main frame 20, being adjacent to and for delivering crops into a husking unit 50. The conveyor comprises a conventional elevator chain 44 mounted over a driven pulley 45 and a driver pulley 46. As shown in Figure 1, the conveyor extends to opposite sides of an extension of the fore-and-aft center line of the tractor 10, having its receiving end 42 on one side and its delivery end 43 on the other.

The crop treating or husking unit 50 is disposed generally in a position to move the corn in the direction of the line of travel and has a husking chamber 51 with a rear crop-inlet end 52 substantially in transverse alinement with the rear discharge end 40 of the gathering unit 33 and directly beneath the delivery end 43 of the conveyor 41 and a crop-outlet end 53 ahead of the transverse center line of the wheels. Inside the chamber 51 the husking unit has operative means in the form of a steel-lugged draft chain 54 that serves to move the corn over husking rolls 55 forwardly from the inlet end to the outlet end. Husks and trash that have been drawn between the husking rolls are moved rearwardly and out of the husking chamber by a husk conveyor 56. A husk discharge opening 57 is provided in the rear of the husking chamber 51. The bottom panel of the husking chamber 51 is perforated, as at 51a, to permit the passage of shelled corn.

An elevator hopper 60 is provided beneath the husking unit 50 and extends forwardly to receive both the shelled corn passing through the perforated bottom panel and the husked ears of corn dropping from the forward end of the husking rolls 55. As ear corn and shelled corn fall into the hopper, they pass through a blast of air from a cleaning fan 58. This air blast blows remaining loose husks, silks and light trash out of the machine.

The hopper 60 delivers the crop into a fore-and-aft extending wagon elevator 61 carried on the main frame by suitable framework 62 and 62ª that incidentally supports the hopper and husking unit as well. The elevator is disposed laterally inwardly of the treating unit and has a relatively low forward end 61ª proximate to and for receiving crops from the hopper 60 and a relatively high rear or discharge end 61ᵇ rearwardly of the aforesaid center line of the wheels 14, 15. The elevator 61 extends beneath the transverse conveyor 41 and above the center line of the wheels and the main tubular frame 20 and is substantially in fore-and-aft alinement with the aforesaid hitch means 31 as shown in Figure 1.

Rear hitch means of a suitable nature referred to as 63 is mounted on the main tubular frame 20 for receiving the forward end of a tongue 64 connecting the trailing receptacle 16 to the harvester. The hitch 63 is positioned so that the receptacle will travel directly rearwardly of the tractor.

While the invention has been described in respect to a two-row tractor, the harvester is readily adjustable to be pulled by either a one- or two-row tractor. As shown in Figure 1 in dotted representation the tubular member 25 that serves as the draft tongue for the harvester is laterally adjustable at its forward end through shortening or lengthening the stabilizing member 27 which for this purpose serves as the adjusting means. To further balance the assembly, the rear hitch means 63 could be moved laterally inwardly so as to pull the receptacle directly behind the one-row tractor. The wheels of a one-row tractor would straddle the crop row R².

On the two row tractor as shown in Fig. 1, it may be noted that the draft tongue 25 is at a slight angle to the direction of travel thereby indicating that the line of draft is at a slight angle to the direction of travel. Also the modification as concerns a one row tractor as shown in representative form in Fig. 1 would indicate the line of draft to be slightly angled to the direction of travel. Therefore, while the line of draft is not necessarily directly on the rearward extension of the fore-and-aft center line of the tractor the slight variation therefrom is of a relatively small amount and, consequently, for all practical purposes the line of draft may be treated as being substantially on the rearward extension of the fore-and-aft center line of the tractor. Likewise, for use with the one row tractor, the discharge elevator 61 is not directly on the fore-and-aft center line but slightly to the right of it. However, for all intents and purpose the discharge elevator may be treated as being substantially on the extension of the center line of the draft vehicle since a small variation from the exact center line would not effect its discharge into the wagon 16. It should be recognized that various models and varying row-type tractors will have an effect of positioning the elevator and the line of draft slightly either to the left or right of the tractor center line while still maintaining them in a broader sense substantially on the center line.

Various other modifications and alterations in the preferred embodiment of the invention disclosed herein as well as the accomplishment of specific objects and features not specifically enumerated, will undoubtedly occur to those skilled in the art. It is not the intention therefore to limit the invention to the form shown herein.

What is claimed is:

1. A crop-harvester adapted to be drawn over a field of row-planted crops by a draft vehicle, comprising: a main frame having first and second sides spaced apart transversely to the line of travel and on opposite sides respectively of a fore-and-aft center line of the draft vehicle; a draft tongue connecting the main frame to the vehicle; a gathering unit carried on the first side of the main frame and extending forwardly to gather from a crop row and having a rear discharge end; a crop-treating unit carried on the second side of the main frame in laterally spaced relation to the gathering unit, said treating unit having a crop-inlet end and a crop-outlet end; a transversely disposed crop conveyor extending between the gathering unit and treating unit and having a receiving end adjacent to and receiving crops from the gathering unit discharge end and a delivery end adjacent to and for delivering crops into the inlet end of the treating unit; means operative in said treating unit for causing crops to move from the inlet end to the outlet end thereof; and an elevator carried by the main frame and having a relatively low end positioned laterally inwardly of the treating unit for receiving crops from the outlet end of the treating unit and a discharge end remote from and above the harvester, said elevator being positioned substantially on an extension of the fore-and-aft extending center line of the draft vehicle.

2. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides and substantially on the extension of the fore-and-aft center line of the tractor; a gathering unit carried on the first side of the main frame and extending forwardly to gather from a crop row and having a rear discharge end; a crop-treating unit carried on the second side of the main frame in laterally spaced relation to the gathering unit, said treating unit having a rear crop-inlet end substantially in transverse alinement with the rear discharge end of the gathering unit and a forward crop-outlet end; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend beneath the transverse conveyor, the rear end of said elevator being substantially centered on a rearward continuation of the aforesaid line of draft; and rear hitch means on the main frame substantially centered on the said line of draft for connecting to the main frame a trailing receptacle adapted to receive crops from the rear end of the elevator.

3. A crop-harvester adapted to be drawn over a field of row-planted crops, comprising: a main frame; a pair of supporting wheels carrying the main frame and spaced apart transversely to the line of travel to straddle a pair of adjacent rows of crops; a draft tongue connected to the main frame intermediate the wheels and extending forwardly, said tongue having a forward end provided with hitch means for connection to a tractor along a line of draft closely inwardly of one of the supporting wheels and adjacent to one of a pair of rows straddled by the wheels and substantially on an extension of the fore-and-aft center line of the tractor; a gathering unit carried by the main frame just inwardly of the other wheel and extending forwardly to gather from the other row of said wheel-straddled pair of rows; said gathering unit having a rear discharge end behind the transverse center line of the wheels; a crop-treating unit carried by the main frame in laterally spaced relation to the gathering unit and proximate to said one wheel, said treating unit having a rear crop-inlet end substantially in transverse alinement with the rear discharge end of the gathering unit and said treating unit having a crop-outlet end ahead of the transverse center line of the wheels; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; a fore-and-aft extending elevator carried by the main frame laterally inwardly of the treating unit and having a relatively low forward end proximate to and for receiving crops from the outlet end of the treating unit and a relatively high rear end rearwardly of the treating unit and a relatively high rear end rearwardly of the aforesaid center line of the wheels, said elevator extending beneath the transverse conveyor and above the center line of the wheels; the rear end of the elevator being substantially centered on a rearward continuation of the aforesaid line of draft; and rear hitch means on the main frame substantially centered on said line of draft for connecting to the main frame a trailing receptacle adapted to receive crops from the rear end of the elevator.

4. A crop-harvester adapted to be drawn forwardly over a field by a draft vehicle comprising: a mobile frame disposed transversely to the line of advancement; a harvesting unit carried on the frame to one side of an extension of the fore-and-aft center line of the draft vehicle; a crop-treating unit carried on the frame in laterally spaced relation to the harvesting unit and on the opposite side of said extension of the fore-and-aft center line, a crop conveyor carried by the frame for delivering crops from the harvesting unit to the treating unit; and a fore-and-aft extending elevator carried by the frame laterally inwardly of the treating unit and substantially on the extension of the fore-and-aft center line and having a relatively low forward end proximate to and for receiving crops from the treating unit and a rear discharge end remote from the treating unit.

5. A crop-harvester adapted to advance over a field comprising: a mobile frame disposed transversely to the line of advancement; a gathering unit carried on the frame; a crop-treating unit carried on the frame in laterally spaced relation to the gathering unit, a crop conveyor carried by the frame for delivering crops from the gathering unit to the treating unit; and a fore-and-aft extending elevator carried by the frame laterally inwardly of the treating unit and having a relatively low forward end proximate to and for receiving crops from the treating unit and a rear discharge end remote from the treating unit and at a level above that of the crop conveyor.

References Cited in the file of this patent

UNITED STATES PATENTS

| 1,049,082 | Hansmann | Dec. 31, 1912 |
| 1,785,647 | Powell | Dec. 16, 1930 |
| 2,048,141 | Ronning | July 21, 1936 |
| 2,269,828 | Michel et al. | Jan. 13, 1942 |
| 2,492,897 | Siefken | Dec. 27, 1949 |
| 2,515,808 | Stoddard | July 18, 1950 |
| 2,669,824 | Dwyer | Feb. 23, 1954 |

OTHER REFERENCES

"Dearborn-Wood Bros. Corn Picker," copyright, 1948, pages 1, 2, 3, 11. (Copy available in Division 5.)